No. 705,088. Patented July 22, 1902.
O. HOVE.
ENGINE VALVE GEAR.
(Application filed May 6, 1901.)
(No Model.) 4 Sheets—Sheet 1.
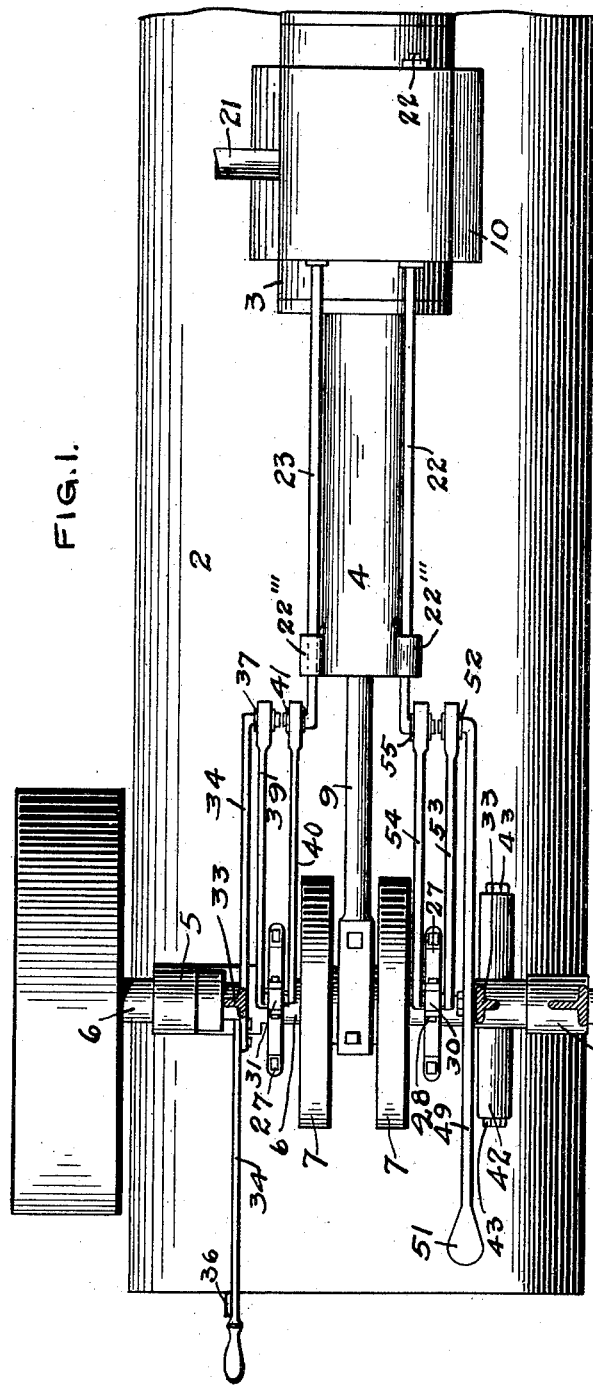
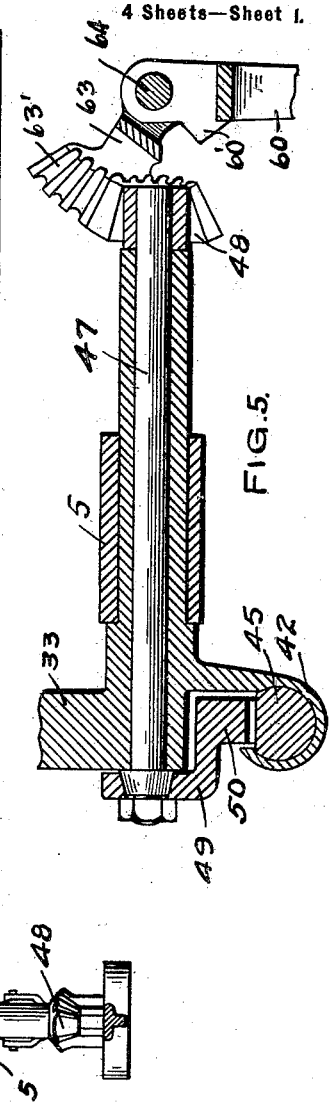
WITNESSES
E. G. Staude
M. E. Gooley
INVENTOR
OLE HOVE
BY Paul & Hawley
HIS ATTORNEYS
THE NORRIS PETERS CO., PHOTO-LITHO., WASHINGTON, D. C.

No. 705,088. Patented July 22, 1902.
O. HOVE.
ENGINE VALVE GEAR.
(Application filed May 6, 1901.)
(No Model.) 4 Sheets—Sheet 2.

WITNESSES
E. J. Staude
M. C. Gosley

INVENTOR
OLE HOVE
BY Paul Hawley
HIS ATTORNEYS

THE NORRIS PETERS CO., PHOTO-LITHO., WASHINGTON, D. C.

No. 705,088. Patented July 22, 1902.
O. HOVE.
ENGINE VALVE GEAR.
(Application filed May 6, 1901.)
(No Model.) 4 Sheets—Sheet 3.

WITNESSES
E. G. Staude
M. C. Gooley

INVENTOR
OLE HOVE
BY Paul & Hawley
HIS ATTORNEYS

No. 705,088. Patented July 22, 1902.
O. HOVE.
ENGINE VALVE GEAR.
(Application filed May 6, 1901.)

(No Model.) 4 Sheets—Sheet 4.

WITNESSES
E.G.Staude
M.E.Cooley

INVENTOR
OLE HOVE
BY Paul & Hawley
HIS ATTORNEYS.

UNITED STATES PATENT OFFICE.

OLE HOVE, OF ELPASO, WISCONSIN.

ENGINE VALVE-GEAR.

SPECIFICATION forming part of Letters Patent No. 705,088, dated July 22, 1902.

Application filed May 6, 1901. Serial No. 58,884. (No model.)

*To all whom it may concern:*

Be it known that I, OLE HOVE, of Elpaso, Pierce county, Wisconsin, have invented certain new and useful Improvements in Engine Valve-Gear, of which the following is a specification.

This invention relates to improvements in engine valve-gear, and particularly to improvements in valve-gear for traction-engines; and the present invention is an improvement upon that shown and described in Letters Patent of the United States No. 670,104, issued to me March 19, 1901.

The principal object of my invention is to save steam. With the ordinary throttling governor there is a great waste of steam, because with said governor the engine - wire draws the steam and cuts off too late to get much benefit from the expansion. Again, an automatic engine with one valve only if it cuts off early will exhaust early, and where the exhaust-valve is closed too early there will be a heavy cushion of steam to overcome. By employing two valves I can cut off the steam early and retain the steam in the cylinder almost to the end of the stroke before exhausting, thereby securing great economy. By this means I obtain greater power with a given amount of steam.
My present invention simplifies the construction and improves the operation of the mechanism shown and described in my former patent above referred to.

By my present invention I secure still better results than are secured by my former invention, and at the same time I greatly simplify the construction of the device and lessen its cost.

To these ends my invention consists generally in the constructions and combinations of parts, all as hereinafter described, and particularly pointed out in the claims.

Figure 2:
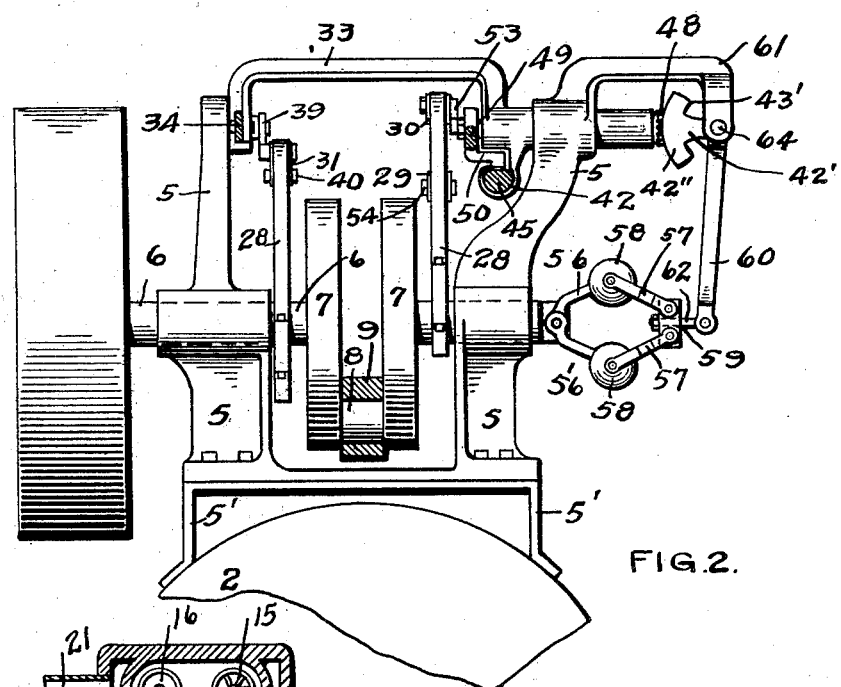
Figure 14:
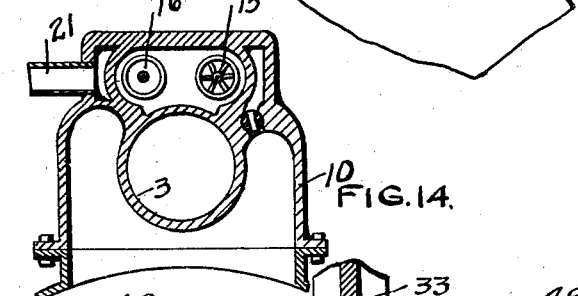
Figure 3:
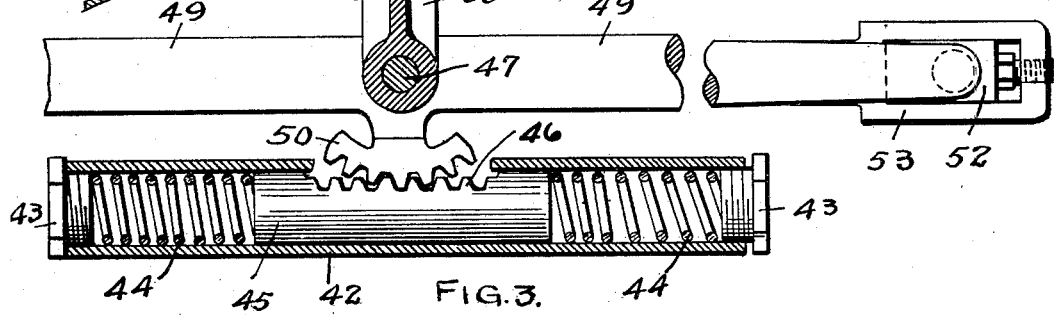
Figure 4:
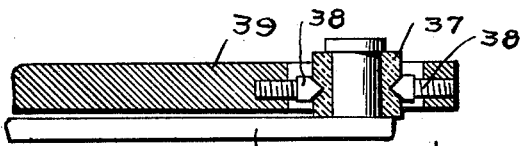
Figure 6:
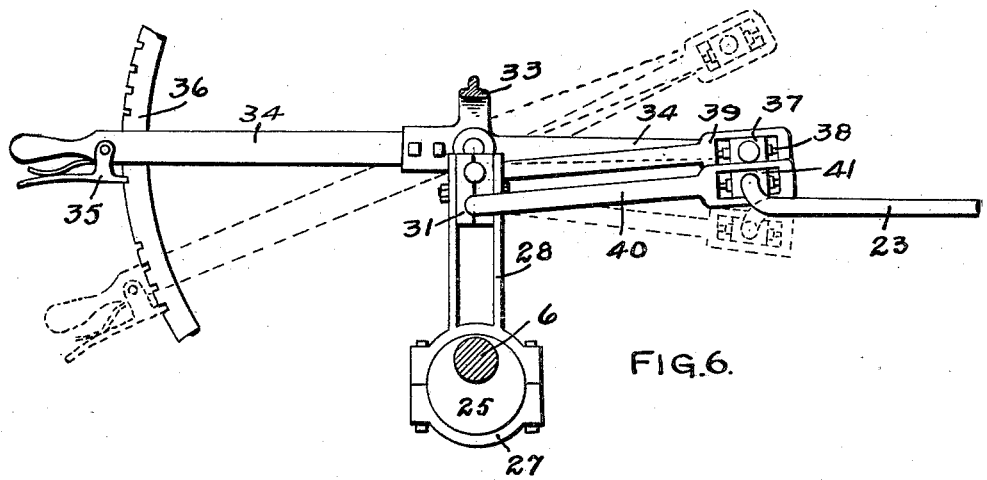
Figure 7:
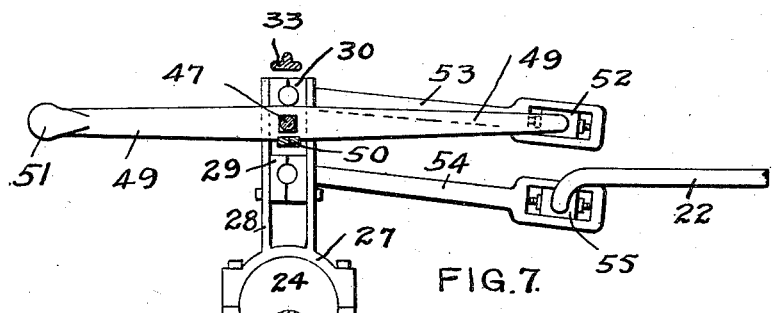
Figure 8:
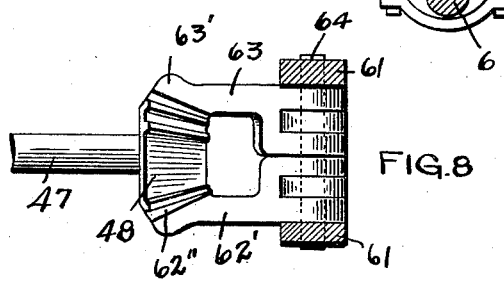
Figure 9:
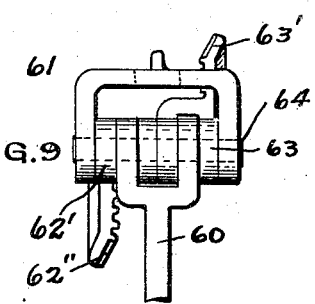
Figure 10:
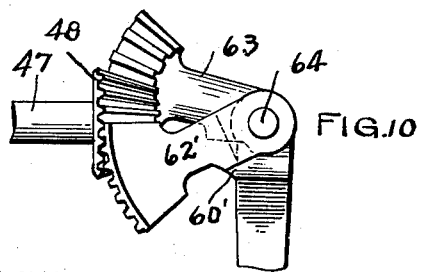
Figure 11:
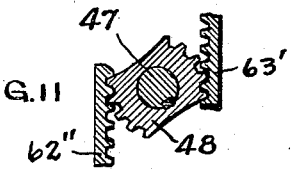
Figure 12:
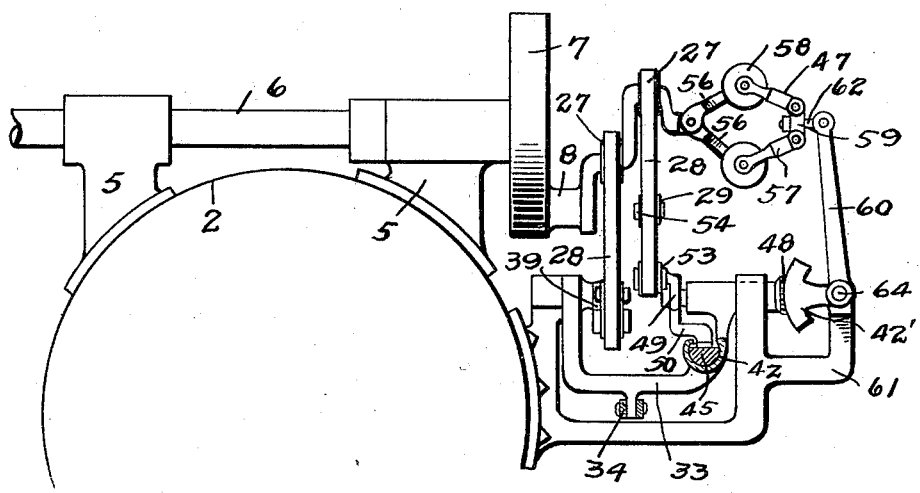
Figure 13:
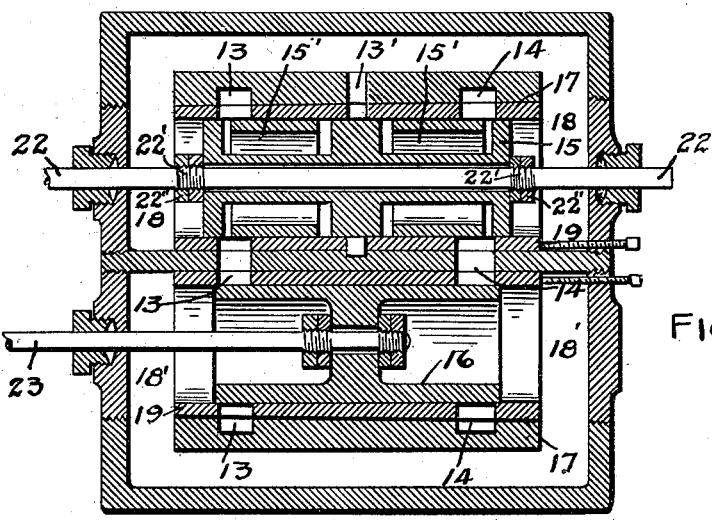

In the accompanying drawings, forming part of this specification, Figure 1 is a plan view of a portion of a traction-engine boiler with an engine embodying my invention arranged upon the top of the boiler. Fig. 2 is an end elevation showing a part of the boiler, the crank-shaft, and a valve-gear embodying my invention. Fig. 3 is a detail of the shifting lever for the steam-valve. Fig. 4 is a detail section showing the means for adjusting the valves. Fig. 5 is a section through the resistance device. Fig. 6 is a side elevation showing the eccentric and means for controlling the exhaust-valve. Fig. 7 is a similar view of the means for controlling the steam-valve. Figs. 8, 9, 10, and 11 are details of the means connected with the lever that is controlled by the governor and which operates the mechanism that controls the steam-valve. Fig. 12 is an end elevation showing a modification. Fig. 13 is a section of the steam-chest and the steam and exhaust valves. Fig. 14 is a transverse section through the steam-dome, cylinder, and steam-chest.

In the drawings, 2 represents the boiler of the engine.

3 is the engine - cylinder; 4, the engine-frame; 6, the crank-shaft, and 5 the bearings for said shaft, which are supported upon the boiler by means of the brackets 5'. Suitable means are also provided for securing the engine frame and cylinder upon the top of the boiler 2. The crank-shaft is what is known as a "center" crank-shaft, and, as here shown, it is provided with the two crank-disks 7, connected by a crank-pin 8, and these crank-disks are arranged at the center of the shaft and between the two bearings or supports 5. Instead of the crank disks and pin an ordinary crank can be used. A connecting-rod 9 is connected to the crank-pin 8, and it is also connected to the cross-head, that is in turn connected to the piston-rod of the piston which is located within the cylinder. The steam-dome 10 preferably surrounds the central part of the cylinder 3, as shown in detail in Fig. 14, and the steam-chest 12 is arranged upon the cylinder 3 above the steam-dome 10. The dome, cylinder, and chest may all be cast integrally, as shown. The steam-chest is made in two divisions and is similar to that shown and described in my former patent. The ports from the ends of the cylinder lead into the steam-chest, terminating in the ports 13 and 14. As in my former patent, I prefer to employ two valves, one for the steam and the other for the exhaust. The exhaust-valve 16 is a simple sliding valve adapted to close both ports 13 and 14. The steam - valve is provided with the longitudinal steam-ducts 15'. The valves slide in the valve-cylinders 17, the ends of which open into the ducts 18 18' in the steam-chest for the live and exhaust steam, respectively. I also prefer to provide the sleeves 19 in the valve-cylinders, which sleeves may be removed when worn and replaced by others. Screw-rods 19' may be provided to extend through the end of the steam-chest and engage the sleeves 19 and hold them in position. A port 13' leads from the duct 18 into and around the valve-cylinder 17, this port being located substantially at the center of the sleeve and valve-cylinder. When the steam-valve moves so as to open either of the ports 13 or 14, the port 13' will be simultaneously uncovered, and steam will pass through this port and through the ducts 15' into the port 13 or 14, as the case may be. By this means steam is very quickly admitted to the engine-cylinder at each movement of the valve 15. The steam-duct 18 connects directly with the steam-dome 10, as shown in Fig. 14, while the exhaust-duct 18' connects with the exhaust-pipe 21. The throttle 10' is located in the duct leading from the dome to the steam-chest. The valve-rod 22 for the valve 15 extends, preferably, through stuffing-boxes in both ends of the valve-chest, so that there is no pressure on the end of the valve-rod, and the valve is therefore perfectly balanced. This rod has, preferably, the screw-threaded portions 22', which are engaged by the nuts 22" and by means of which the valve is secured in position upon the valve-rod. The valve 16 is secured to the valve-rod 23, which extends through a stuffing-box in the end of the steam-chest. These valve-rods are guided by lugs 23' upon the engine-frame 4. (See Fig. 2.) Arranged upon the crank-shaft 6 are the oppositely-placed eccentrics 24 and 25. These eccentrics are engaged by the eccentric-straps 27, and the upwardly-extending rods 28 are connected to or formed integrally with said eccentrics. These rods are preferably made in two parts, the two parts being parallel to each other and affording space between them for the brasses or blocks 29, 30, and 31. These blocks are adjusted to the desired position, the rods 28 being slatted for this purpose, and are then secured in position, preferably by means of suitable bolts. A yoke 33 is pivotally supported in the upper end of the bearings or standards 5, and this yoke extends over the crank and over the rods 28 and is capable of being rocked upon its pivotal supports in the standards 5. The adjusting and reversing lever 34 (see Fig. 6) is secured to this yoke, and it is provided with a spring-latch 35, adapted to engage notches in the curved bar 36. This lever extends beyond the pivot of the yoke 33, and its end is connected, by means of the brass or block 37 and the adjusting-screws 38, with the throw-rod 39, which has its opposite end connected to the brass or block 31. A connecting-bar 40 also connects the end of the valve-rod 23 with the brass or block 31. This bar is also provided with the adjustable brass or block 41, to which the end of the valve-rod 23 is connected. By means of the adjustable block 41 the position of the piston-valve in the valve-cylinder may be regulated. Formed integrally with or secured to the yoke 33 and extending at right angles to the axis or pivot upon which said yoke swings is a resistance device consisting of a tube 42, (see Figs. 2 and 3,) provided with caps 43, that screw into its end, with springs 44, arranged within the tube, and with a shifting block or cylinder 45, also arranged within the tube between the springs 44. This slide is provided upon its upper side with a series of teeth 46, and a slot or recess is provided in the tube over these teeth. A short shaft 47 extends through the axis or pivot of the yoke 33, its outer end being provided with a beveled pinion 48 and its inner end being connected to a lever 49. This lever is provided with a depending lug carrying a segment of a pinion 50, that engages the teeth or rack-bar in the slide 45. The rear end of this lever 49 is provided with the weight 51, and its forward end is connected, by means of the adjustable block 52, to the throw-rod 53, the rear end of which is connected to the block 30. A connecting-bar 54 also connects the end of the valve-rod 22 with the block 29. An adjustable block 55 is provided for the purpose of making the connection between the valve-stem and said connecting-bar. In order that the rods 39 and 40 and 53 and 54 may be parallel with each other when in a central position, although connected to blocks that are arranged at different levels, each of the valve-rods 22 and 23 is provided with a bend or turn at its end, enabling a connection of this kind to be made. (See Figs. 6 and 7.) The governor consists of the toggle-levers 56 and 57, pivotally connected to the end of the shaft 6, provided with the balls or weights 58 and also pivotally connected to the block 59. A lever 60 is pivoted to an extension 61 on the standard 5 and is connected to the block 59 by means of a bolt 62. The upper part of the lever 60 is forked, and each branch thereof extends into a fork in a short arm 62' and 63. (See Fig. 8.) A suitable pin or bolt 64 extends through the extension 61 and forms pivotal connections between the lever 60 and the short arms 62 and 63. Each of these arms is provided with a rack 62" 63', and these racks engage the pinion 48. The spring 44 in the tube 42 tends to hold the block or slide 45 in a central position in said tube, and thereby to hold the lever 49 parallel to said tube, in which case the arm 63 is elevated and the arm 62 depressed, the parts being in the position shown in Fig. 10. When the crank-shaft passes the maximum speed desired, the toggle-levers of the governor are brought together and the lower end of the lever 60 is drawn toward the engine-frame. The lug 60' on the lever then engages the arm 62, (see Fig. 10,) raising said arm and rotating the shaft 47, thereby turning the lever 49, and with it the connecting-bar 53. At the same time the engagement of the pinion with the rack 63' on the arm 63 will depress said arm until it comes in engagement with the lug 60', when further movement of said arm and of the pinion and shaft will be prevented.

In the construction shown in Fig. 12 the shaft 6 instead of having a central crank is provided with cranks at the end, and the valve-gear mechanism is arranged upon a suitable support at the side of the boiler instead of being placed on top thereof. This amounts to practically a reversal of the arrangement of the same parts shown in Fig. 2 of the drawings.

When the device is in operation, if the throw-rods are in a central or horizontal position, as represented by full lines in Figs. 6 and 7 of the drawings, the valves will remain practically stationary, and no steam will be admitted to the cylinder, except possibly a small amount due to the lead there is to the valve. When it is desired to start the engine, the adjusting or reversing lever 34 is turned into an angular position, as represented by dotted lines in Fig. 6, and this through the yoke described will turn the lever 49 into a position parallel with the position of said reversing-lever. The throw-rods will be turned also into an angular position, and thereafter the up-and-down movement of the eccentric-rods 28 and the brasses will through the rods 40 to 54 give to the valve-rods 22 and 23 a reciprocating movement. As the steam-inlet valve is moved the end of the valve will partially pass the port 13 or 14, as the case may be, and steam will pass by the end of the valve into one of said ports. At the same time steam will enter through the port 13', passing through the cylinder having the ducts 15', and will also enter one of said ports 13 or 14. This will quickly admit the steam to the cylinder, and as this valve is separate from the valve controlling the exhaust-port the steam can be cut off early and may be retained in the cylinder almost to the end of the stroke and permitted to work expansively before exhausting, thereby securing great economy in operation.

In operation the governor spreads out and pulls the arm 61 toward the engine-frame, thereby tilting the lever 49 to a horizontal position, and when this position is reached no more steam will be admitted to the cylinder except what little is occasioned by the lead of the valve. As soon as the speed falls the governor will permit the springs arranged in the resistance device to move the throw-rod back to its original position—that is, to the same position as the rod controlling the exhaust. The engine may be reversed by means of the reversing-lever shown. By moving down the outer end of the reverse-lever the throw-rod 39 is moved into an angular position, and the position of that rod will tilt the steam-rod on the other side through the yoke 33 into the same position, and the inclination of the lever 34 and of the valve 49 on the opposite side will govern the throw of the valves—that is to say, if the lever 34 is thrown to a greater inclination a longer travel of the valves is obtained, and the speed of the engine may thus be regulated by the inclination of the reverse-lever. When the reverse-lever is tilted beyond a horizontal position in the opposite direction, the yoke will tilt the throw-rod 49 for the steam-valve in the same direction and the valves will now operate in the reverse direction. To change the lead of the valve, it is only necessary to adjust the block 29 by moving this block upward or downward. By moving the block downward the lead is increased, and by moving it upward the lead is decreased. The rods 28 are preferably slotted to permit of the adjustment of the block 29. The blocks 37, 41, 52, and 53 are made adjustable for the purpose of bringing the opposite ends of the corresponding rods to an exact central position.

Having thus described my invention, I claim as new and desire to secure by Letters Patent—

1. The combination, with the engine provided with a cylinder, piston, crank-shaft and connecting members, said cylinder having independent inlet and exhaust valves, of a valve-gear comprising throw-rods 34 and 49, means connecting said throw-rods with said inlet and exhaust valves, a yoke connecting said throw-rods, an interposed resistance device, and a governor connected directly with the throw-rod that controls the steam-inlet valve, substantially as described.

2. The combination, with the engine provided with independent inlet and exhaust valves, of the reversing and throw-rod lever 34, the throw-rod 49, a yoke connecting said throw-rods, a governor positively connected with one of said throw-rods, and a resistance device interposed between said throw-rods, for the purpose set forth.

3. The combination, with the engine-boiler, of the cylinder, engine-frame and piston mounted upon said boiler, the center crank-shaft connected with the piston-rod of said engine, the throw-rods 34 and 49, one of said throw-rods being connected with the engine-reversing lever, means connecting said throw-rods through an interposed resistance device, a governor, and means connecting said governor with the throw-rod that controls the steam-inlet valve, for the purpose set forth.

4. The combination, with the engine, provided with a cylinder, piston, and piston-operating parts, and with independent inlet and exhaust valves, of a center crank-shaft, a governor driven by the engine, and variable throw-levers connected with the inlet and exhaust valves, substantially as described.

5. The combination, with the engine provided with the independent inlet and exhaust valves, of the crank-shaft, throw-levers arranged upon opposite sides of said crank, means connecting said throw-levers, and a governor connected with and controlling the lever that operates the inlet-valve, for the purpose set forth.

6. The combination, with the engine provided with independent inlet and exhaust valves, of the center crank-shaft, throw-levers arranged at opposite sides of said center crank, means for simultaneously operating both of said levers, and a governor connected with and adapted to operate independently the throw-rod that controls the inlet-valve, substantially as described.

7. The combination, with the engine provided with independent inlet and exhaust valves, of the center crank-shaft, independent throw-rods arranged upon opposite sides of said center crank and connected with said inlet and exhaust valves, a lever for operating or reversing simultaneously the position of both of said throw-levers, and a governor connected with and adapted to operate independently the throw-lever that controls the inlet-valve, for the purpose set forth.

8. The combination, with the engine, provided with independent inlet and exhaust valves, of the crank-shaft 6, the throw-levers 34 and 49, the yoke 33 connected with said levers, an interposed resistance device, and a governor connected with and arranged to operate the throw-lever that controls the inlet-valve, for the purpose set forth.

9. The combination, with the engine and the inlet and exhaust valves, of the throw-levers connected with said valves, the yoke 33 connecting said levers, the interposed resistance device, and a governor connected with the throw-lever that controls the inlet-valve, substantially as described.

10. The combination, with the engine, provided with the independent exhaust-valve, of the reversing and throw lever 34, the connecting-bar 39, the vertically-movable block 31, to which said bar 39 is connected, and the link or rod 40 connecting said block with the exhaust-valve rod, for the purpose set forth.

In testimony whereof I have hereunto set my hand at Minneapolis, Minnesota, this 26th day of April, 1901.

OLE HOVE.

In presence of—
  A. C. PAUL,
  M. E. GOOLEY.